United States Patent [19]

Hung

[11] Patent Number: 4,758,921
[45] Date of Patent: Jul. 19, 1988

[54] GROUNDED SURGE PROTECTION UNIT FOR TELEPHONE SUBSCRIBER CIRCUITS

[75] Inventor: Peter Hung, Wheatley Heights, N.Y.
[73] Assignee: Porta Systems Corp., Syosset, N.Y.
[21] Appl. No.: 17,087
[22] Filed: Feb. 20, 1987
[51] Int. Cl.$^4$ .............................................. H02H 3/22
[52] U.S. Cl. ................................... 361/119; 361/111; 439/620
[58] Field of Search ...................... 361/111, 117–120, 361/392, 395, 412, 413; 439/620

[56] References Cited

U.S. PATENT DOCUMENTS

| 4,009,421 | 2/1977 | Splitt et al. | 361/119 |
| 4,328,524 | 5/1982 | Nozick | 361/119 |
| 4,449,156 | 5/1984 | Singer, Jr. | 361/119 |
| 4,613,732 | 9/1986 | Cwirzen et al. | 361/119 X |
| 4,616,288 | 10/1986 | Scholtholt et al. | 361/119 |
| 4,647,121 | 3/1987 | Dolansky et al. | 361/119 X |
| 4,654,743 | 3/1987 | Ruehl et al. | 361/119 X |

FOREIGN PATENT DOCUMENTS

| 2621101 | 10/1976 | Fed. Rep. of Germany | 361/119 |
| 2750638 | 10/1979 | Fed. Rep. of Germany | 361/119 |

Primary Examiner—A. D. Pellinen
Assistant Examiner—A. Jonathan Wysocki
Attorney, Agent, or Firm—Charles Temko

[57] ABSTRACT

An improved surge protection unit suitable for use with Western Electric Type 66 blocks, having provision for grounding of the individual subscriber circuit at the block location is disclosed.

3 Claims, 1 Drawing Sheet

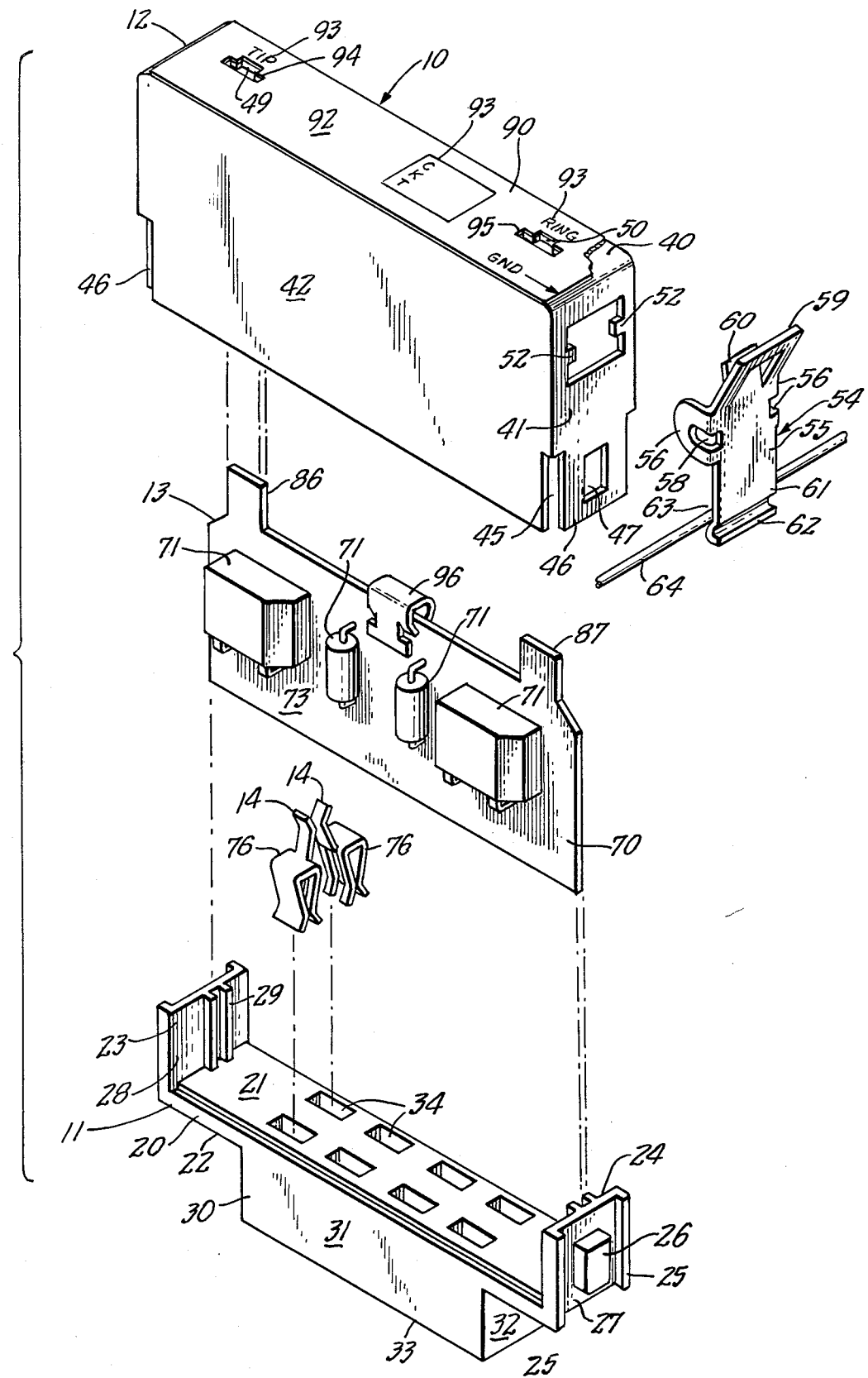

4,758,921

GROUNDED SURGE PROTECTION UNIT FOR TELEPHONE SUBSCRIBER CIRCUITS

RELATED APPLICATION

Reference is made to my copending application Ser. No. 06/752,938; filed July 8, 1985, entitled Minature Maintenance Termination Unit for telephone subscriber circuits which discloses a related invention.

BACKGROUND OF THE INVENTION

This invention relates generally to the field of telephony, and more particularly to an improved form of surge protection unit particularly adapted to be installed upon existing subscriber lines in such locations as motels, small apartment or office buildings and the like without a complicated installation procedure.

In such locations, the existing subscriber lines which are usually twenty-five or less in number are often connected to the telephone company lines through a small connector block of elongated configuration commonly known as a Western Electric Type 66 block, which block has been used in the industry for many years. Blocks of this type are characterized in the provision of an exposed surface mounting for parallel rows of quick clip connectors which are connected through wire wrap means to the telephone company lines, and through the expandable clip portions of the quick clip connectors to the subscriber lines.

With the recent emergence of subscriber owned equipment, and a lessening of maintenance responsibility on the part of the telephone company, it is desirable to provide a surge protection unit at or near the subscriber premises. In the case of buildings having up to twenty-five individual circuits, the use of the Type 66 block is commonly found in multiple installations. On occasion, multiples of this type of block are used in physically juxtaposed locations.

SUMMARY OF THE INVENTION

Briefly stated, the invention contemplates the provision of an improved surge protection unit particularly adapted for use in conjunction with Type 66 quick clip terminal blocks, which can be readily installed as a plug-in unit to occupy very little additional space adjacent to the block. The embodiment includes a two-piece housing mounting a printed circuit board containing the desired protective circuitry, and specialized contacts permitting the edge contacts of the printed circuit board to communicate with side surfaces of related quick clips on the Type 66 block. Provision is made for interconnecting the individual subscriber circuits to a ground wire adjacent the Type 66 block. Provision is also made whereby portions of the printed circuit board may project outwardly of a housing to provide test points for each subscriber circuit, thereby enabling telephone company personnel or a subscriber to conduct on-site tests on an individual circuit of interest.

BRIEF DESCRIPTION OF THE DRAWING

In the drawing, to which reference will be made in the specification, the single FIGURE is an exploded view in perspective of an embodiment of the invention.

DETAILED DESCRIPTION OF THE DISCLOSED EMBODIMENT

In accordance with the invention, the device, generally indicated by reference character 10, comprises broadly, a first housing element 11, a second housing element 12, a printed circuit board element 13, and a plurality of clip connector elements 14.

The first housing element 11 is preferably of synthetic resinous molded construction, and includes a base wall 20 bounded by an upper surface 21, a lower surface 22, and first and second end walls 23 and 24. The walls 23-24 are provided with flanged end portions 25, and support an outwardly projecting detent 26 on an outer surface 27 thereof. A corresponding inner surface 28 is provided with channel forming members 29 which accommodate a portion of the circuit board element 13.

Depending from the lower surface 22 is a sub-housing 30 bounded by a pair of side surfaces, one of which is indicated by reference character 31, and a pair of end surfaces, one of which is indicated by reference character 32 as well as a lower surface 33. A plurality of rectangular bores 34 are arranged in two rows of four each and extend from the upper surface 21 to a lower surface 33.

The second housing element 12 is electrically conductive, and is preferably formed as a metallic drawing or stamping. It is bounded by an upper wall 40, a pair of end walls, one of which is indicated by reference character 41, and a pair of side walls, one of which is indicated by reference character 42 each having a centrally disposed opening 47 which selectively engages the detent 26 on the first housing element 11 on each side of the device. Positioned in the upper wall 40 are a pair of upper slotted openings 49 and 50. One of the side walls 42 accommodates a ground wire clip 54, preferably formed as a stamping from phosphor bronze or similar material. The clip 54 includes a bent out resilient tab 60 which bears against and is welded to the corresponding outer surface of the housing element 12. The inner end 61 of the body 55 includes a curved terminal 62 forming an interstice 63 for the accommodation of a ground wire 64. When the device 10 is engaged upon a Type 66 block (not shown), the ground wire 64 will normally be present, and the clip 54 is manually opened simultaneously with engagement, and released with the seating of the device within the block.

The printed circuit board element 13 includes a dilectric substrate 70 upon which plural custom made semiconductor electronic components 71, including fuses are mounted. It is bounded by opposed surfaces, one of which is indicated by reference character 73, and communicates with the quick clip connectors on the block by U-shaped clip members 76 in known manner.

To permit testing by telephone company personnel or a subscriber, the circuit board element 13 is provided with a pair of extensions 86 and 87 which form test points, and which project through the openings 49 and 50. To prevent test prods (not shown) from shorting on the housing 12, there is provided an insulative paper lamina 90, which is attached to the housing 12 with a pressure sensitive adhesive (not shown). The outer surface 92 thereof may be provided with suitable indicia 93 for identifying the circuit, and openings 94 and 95 are disposed in congruent relation with respect to the openings 49 and 50.

By means of the above described structure, it is possible to provide grounding at the point of installation of the device on the Type 66 block in a manner which is not otherwise available. Existing Type 66 blocks possess their own grounding connections, but normally the protection unit will not. This is accommodated by the provision of the ground conductors 64 which may, at one end thereof, be interconnected with any suitable source of ground potential.

I wish it to be understood that I do not consider the invention to be limited to the precise details of structure shown and set forth in this specification, for obvious modifications will occur to those skilled in the art to which the invention pertains.

I claim:

1. A surge protection unit utilizing individual subscriber parts adapted to be mounted upon a connector block having parallel rows of quick clip connectors comprising: a first housing element of generally rectangular configuration and having a planar transversely extending wall defining plural rectangularly shaped channels which receive quick clip terminals on a corresponding connector block, and a pair of symmetrically arranged end walls having detent means on an outer surface thereof; a second housing element of corresponding rectangular configuration defining a recess and having end walls corresponding to those of said first housing element including flexible terminal portions thereon having means selectively engaging said detent means; a planar rectangular circuit board of dimensions corresponding to that of said recess in said second housing element and slideably engaged therein; and a plurality of clip connector elements engageable at one end thereof upon said circuit board along one conductive surface thereof, said connector elements at a second end thereof having opposed resilient tongues thereon extending into said plural channels in said first housing element whereby to make contact with said quick clip terminals upon said connector block; said second housing element being formed at least in part of electrically conductive material, a first conductive spring clip communicating with said circuit board and an inner surface of said second housing, and a second conductive spring clip mounted upon an outer surface of said second housing and having means for engaging a grounding conductor and clamping said conductor against an outer surface of said second housing.

2. A surge protection unit in accordance with claim 1, in which said ground conductor in engaged condition has a principal axis perpendicular to the plane of said circuit board whereby to interconnect second conductor spring clips of adjacently mounted surge protection units.

3. A surge protection unit in accordance with claim 1, further characterized in said outer surface of said second housing element having a perforate insulative lamina upon a transversely extending wall thereof, said wall and lamina having a pair of through openings therein, said circuit board having projecting portions carrying test points thereon extending through said openings to permit circuit testing of said circuit board when said surge protection unit is in engaged condition upon said connector block.

* * * * *